United States Patent [19]
Arai

[11] 4,358,806
[45] Nov. 9, 1982

[54] MAGNETIC RECORDING AND REPRODUCING METHOD AND MAGNETIC RECORDING MEDIUM THEREFOR

[75] Inventor: Yoshihiro Arai, Asaka, Japan
[73] Assignee: Fuji Photo Film Co., Ltd., Japan
[21] Appl. No.: 143,110
[22] Filed: Apr. 23, 1980
[30] Foreign Application Priority Data
 Apr. 27, 1979 [JP] Japan ................................ 54/52224
[51] Int. Cl.³ .......................... G11B 5/25; G11B 5/20
[52] U.S. Cl. ..................................... 360/119; 360/123
[58] Field of Search ................................ 360/119, 123
[56] References Cited
U.S. PATENT DOCUMENTS

| 2,272,821 | 2/1942 | Roys | 360/119 |
|---|---|---|---|
| 2,927,973 | 3/1960 | Geller | 360/123 |
| 3,004,111 | 10/1961 | Hollingsworth | 360/123 |
| 3,157,748 | 11/1964 | Eldredge | 360/123 |
| 3,349,382 | 10/1967 | Naylor et al. | 360/123 |
| 3,651,311 | 3/1972 | Berezin et al. | 360/119 |
| 3,706,926 | 12/1972 | Barrager et al. | 360/119 |
| 3,984,874 | 10/1976 | Mano | 360/119 |

Primary Examiner—Vincent P. Canney
Attorney, Agent, or Firm—Pasquale A. Razzano

[57] ABSTRACT

A number of blocks made of a high magnetic permeability material are arranged in parallel with a very fine pitch on a non-magnetic substrate. A number of pairs of electrodes are provided to interpose the blocks therebetween. The pairs of electrodes are electrically connected with each other. A magnetic recording layer is provided adjacent to the blocks so that a part thereof is magnetized when the block adjacent thereto is excited. A pair of metal styluses or the like are put into contact with the electrodes and an electric current modulated with information is caused to flow through the styluses to excite the block interposed therebetween and magnetize the magnetic recording layer adjacent thereto when recording information. When reproducing the recorded information, a pair of metal styluses are put into contact with the opposite ends of the block and an electric current is caused flow through the block. The recorded information is read in the form of variation in electric current flowing therethrough or voltage thereacross obtained as the styluses are moved with respect to the recording medium along the direction in which the blocks are arranged.

4 Claims, 8 Drawing Figures

MAGNETIC RECORDING AND REPRODUCING METHOD AND MAGNETIC RECORDING MEDIUM THEREFOR

BACKGROUND OF THE INVENTION

1. Field of the Invention

This invention relates to a magnetic recording medium and a method of recording and reproducing information by use of the magnetic recording medium, and more particularly to a magnetic recording medium and a magnetic recording and reproducing method using the same in which the recording and reproduction are conducted without use of a magnetic head.

2. Description of the Prior Art

The conventional magnetic recording medium mainly consists of a non-magnetic substrate and a magnetic recording layer disposed thereon. In recording information on the recording medium and reproducing the recorded information from the recording medium, a magnetic head composed of a C-shaped core and a coil wound thereon is used. The magnetic head is used in contact with the surface of the magnetic recording layer, and accordingly, the surface of the magnetic recording layer is apt to be damaged by the magnetic head due to friction between the head and the layer. Further, the core of the head is also apt to be damaged by friction with the magnetic recording layer. For instance, the gap at the tip of the head close to the magnetic recording layer is liable to be clogged with the magnetic material scratched off from the recording layer. These damages of the magnetic recording layer and the magnetic head badly influence the performance of recording and reproduction.

Further, the magnetic head occupies a large space due to its structure composed of a core and a coil wound thereon, and accordingly makes it impossible to conduct a high density multi-track recording.

SUMMARY OF THE INVENTION

The primary object of the present invention is to provide a novel magnetic recording medium on which information can be recorded without use of the conventional magnetic head.

Another object of the present invention is to provide a method of recording and reproducing information on a magnetic recording medium without a magnetic head.

The specific object of the present invention is to provide a magnetic recording system in which magnetic recording is performed by use of a thin stylus that is not put into contact with the surface of the magnetic recording medium.

A further object of the present invention is to provide a magnetic recording system in which information can be recorded and reproduced at high density in the form of a multi-track recording mode.

The magnetic recording medium in accordance with the present invention comprises a non-magnetic substrate, a number of first blocks made of high magnetic permeability material arranged on said substrate with a fine pitch, a number of second blocks made of electrode material located on the opposite sides of said first blocks so as to apply independent electric field to said first blocks, a connecting member for electrically connecting adjacent blocks, and a magnetic recording layer provided adjacent said first blocks, at least a part of said first and second blocks being exposed on the surface of said medium.

Said first and second blocks may be alternately provided on the surface of the substrate. Alternatively, said second blocks may be located on and beneath said first blocks.

The magnetic recording method in accordance with the present invention comprises bringing a pair of metal styluses into contact with the exposed part of a pair of said second blocks located opposite sides of one of said first blocks, causing a modulated electric current to flow through said metal styluses to excite said first block interposed between said pair of second blocks thereby magnetizing a part of the magnetic recording layer adjacent to said excited first block, and moving said pair of metal styluses relative to the magnetic recording medium to successively excite said first blocks one by one and magnetize the magnetic recording layer according to the modulated electric current.

Further, the magnetic reproducing method in accordance with the present invention comprises bringing a pair of metal styluses into contact with the exposed opposite ends of the first block of a magnetic recording medium as mentioned above, causing an electric current to flow through the metal styluses, reading out the recorded information as the variation in the electric voltage or current obtained at the metal styluses, and moving the pair of metal styluses relative to the magnetic recording medium to successively read out the information with respect to said first blocks one by one.

In accordance with the present invention as summarized above, a magnetic head is not put into contact with a magnetic recording layer. Therefore, there is no fear of damaging the magnetic recording layer. In addition, since only a pair of metal styluses are used instead of the conventional magnetic head, the structure of the magnetic head is very simple and occupies a small space. Accordingly, it is possible to perform a high density multi-track recording.

DESCRIPTION OF THE PREFERRED EMBODIMENTS

Figure 1:
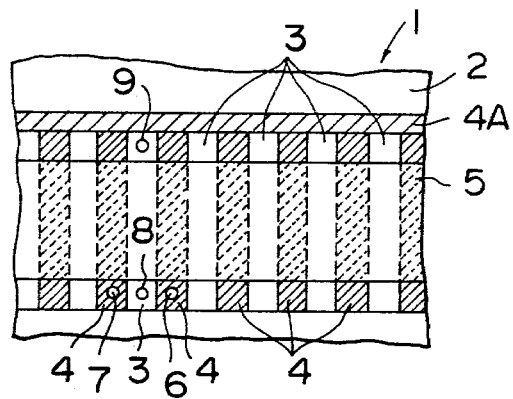
FIG. 1 is a plan view showing a part of the magnetic recording medium in accordance with an embodiment of the present invention.

Now the present invention will be described in detail with reference to preferred embodiments thereof referring to the accompanying drawings.

A first embodiment will now be described with reference to FIGS. 1 to 3. The magnetic recording medium in accordance with this embodiment indicated generally at 1 comprises a non-magnetic base 2 made of a non-magnetic material such as glass, plastics and non-magnetic metal. On the surface of the base 2 are arranged a great number of first blocks 3 made of a high magnetic permeability material like permalloy and arranged at a very fine pitch. A great number of second blocks 4 made of conductive metal like Cu and Al are provided on the opposite sides of the first blocks 3 so as to interpose the first blocks 3 therebetween and apply an electric field to each first block 3. The first blocks 3 are electrically independent of each other. The second blocks 4 are electrically connected with each other by way of a connecting path 4A located along one end of the second blocks 4. The connecting part or member 4A is made of the same material as that of the second blocks 4. The first and second blocks 3 and 4 are arranged alternately on the base or substrate 2. There should preferably be provided insulating layers between the adjacent first and second blocks 3 and 4. On the surface of the first and second blocks a magnetic recording layer 5 of conventional type, such as conventional magnetic tape, is provided so as to expose the opposite ends of the blocks on the opposite sides thereof.

Figure 3:
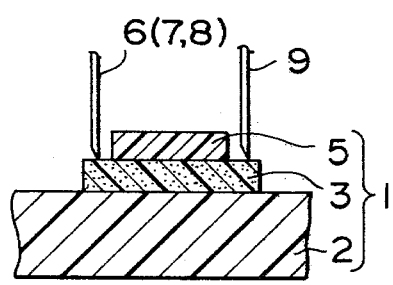
FIG. 3 is a cross sectional view taken along the line III—III.

When recording information on the magnetic recording medium 1 as described above, a pair of metal styluses 6 and 7 are brought into contact with two second blocks 4 interposing therebetween one first block 3 as shown in FIGS. 1 and 3. An electric current modulated by the information to be recorded is caused to flow through the styluses 6 and 7 and accordingly through the second blocks 4. Consequently, the first block 3 interposed between the two second blocks 4 is excited and thereby the magnetic recording layer 5 is magnetized at the part adjacent to the excited first block 3. The degree of magnetization depends upon the amount of the electric current flowing through the second blocks 4 that is the current supplied to the metal styluses 6 and 7. The metal styluses 6 and 7 are moved relative to the recording medium 1 along the direction in which the blocks 3 and 4 are arranged and the recording of information is made for each first blocks 3 one by one. In this operation, either the styluses 6 and 7 or the recording medium 1 is moved with respect to the other to effect the relative movement therebetween. Normally, the styluses 6 and 7 are moved with the medium 1 held stationary.

When reproducing the information thus recorded in the magnetic recording layer 5 of the recording medium 1, a pair of metal styluses 8 and 9 are put into contact with opposite ends of the first block 3 at the exposed part thereof. Then, the pair of metal styluses 8 and 9 are supplied with an electric current to have an electric current flow through the first block 3. The first block 3 provides different resistance according to the level of the magnetic field effected thereon by the magnetic flux formed by the magnetized part of the magnetic recording layer 5. Therefore, the recorded information can be read out in the form of variation in the electric current or voltage. As the metal styluses 8 and 9 are moved relative to the blocks 3 in the direction in which the blocks 3 and 4 are arranged, the read out of information can be conducted one by one for the blocks 3 and the recorded information can be read out.

Figure 4:
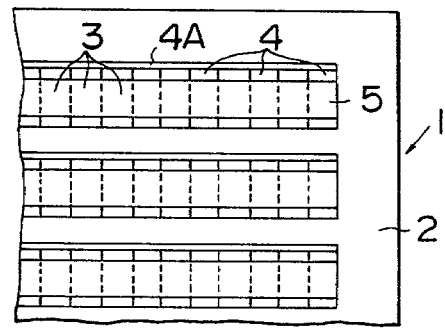
FIG. 4 is a fragmentary plan view showing a part of a multi-track type magnetic recording medium in accordance with an embodiment of the present invention.

The information recording and reproduction can be made for one track as mentioned above. By arranging a number of tracks for instance in parallel on a large substrate 1, a multi-track recording and reproduction can be performed. One example of the multi-track recording medium is shown in FIG. 4 in which all the elements are designated by the same reference numerals as used in FIGS. 1 to 3. Since it is possible to make the length of the first and second blocks 3 and 4 very short, it is possible to make a high density multi-track recording.

Figure 5:
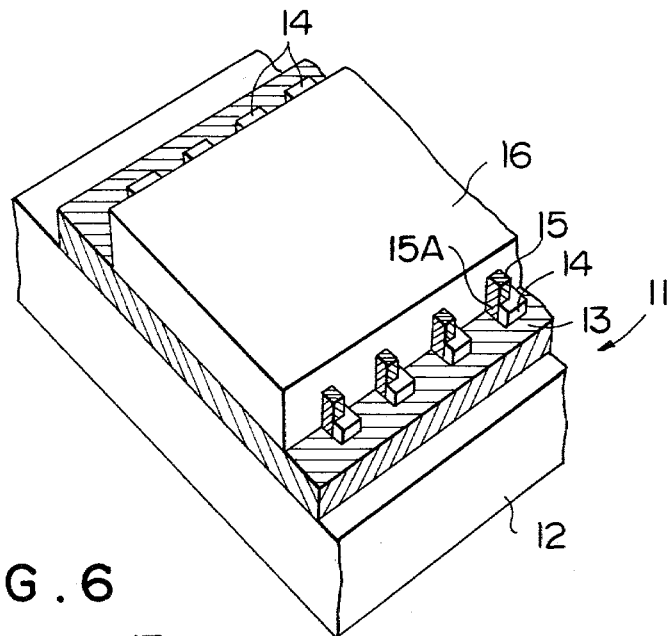
FIG. 5 is a fragmentary perspective view showing a part of the magnetic recording medium in accordance with a second embodiment of the present invention.
Figure 6:
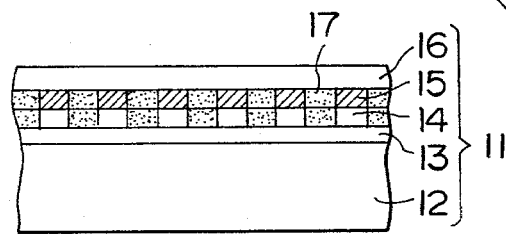
FIG. 6 is a side view of the magnetic recording medium as shown in FIG. 5.
Figure 7:
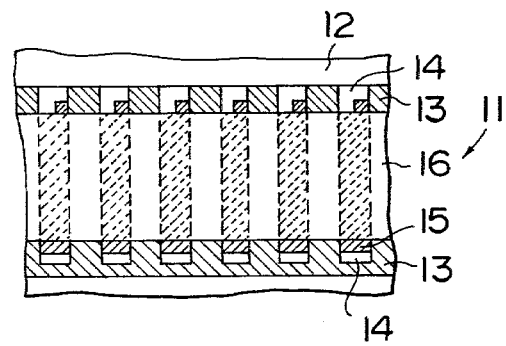
FIG. 7 is a fragmentary plan view of the magnetic recording medium as shown in FIGS. 5 and 6.
Figure 8:
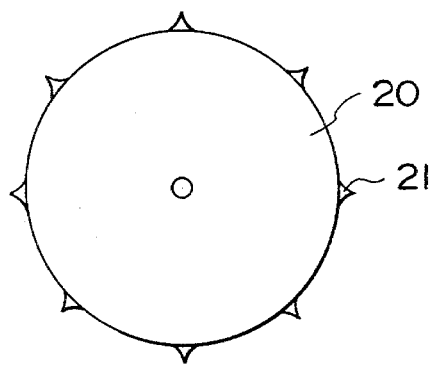
FIG. 8 is a side view showing a variation of the styluses used in the magnetic recording and reproducing method in accordance with the present invention.

Another embodiment of the present invention will be described in detail with reference to FIGS. 5 to 7. The magnetic recording medium 11 in accordance with the second embodiment of the invention comprises a non-magnetic base 12 similarly to the first embodiment. On the surface of the base 12 are arranged a plate-like electrode 13 having a definite width. The electrode 13 is provided on the surface thereon with a great number of first blocks 14 arranged at a very fine pitch. The first blocks 14 are made of a high magnetic permeability material. The first blocks 14 extend in the direction of the width of the plate-like electrode 13. The length of the first blocks 3 is slightly smaller than the width of the electrode 13. Either of the ends of the blocks 14 does not project out of the side edge of the electrode 13. On the upper face of the first block 14 is provided an electrode block 15. A part of the electrode block 15 extends downward through the first block 14 to electrically connect the electrode block 15 to the electrode 13. The connecting part of the electrode block 15 is indicated by 15A in FIG. 5. The electrode block 15 and the electrode 13 constitute the second blocks 4 in the above embodiment shown in FIGS. 1 to 3 and the first block 14 interposed therebetween corresponds to the first block 3 in said embodiment. Between the first block 14 and the electrode block 15 and between the first block 14 and the electrode 13 may be provided a non-magnetic film as of glass, copper or plastics to make the surface of these elements flat at the boundaries.

On these elements is provided a magnetic recording layer 16 in contact therewith. When the first blocks 14 made of the high permeability material is conductive, the first blocks 14 are covered with an insulating film with only the part to be contacted with the metal styluses exposed.

Figure 2:
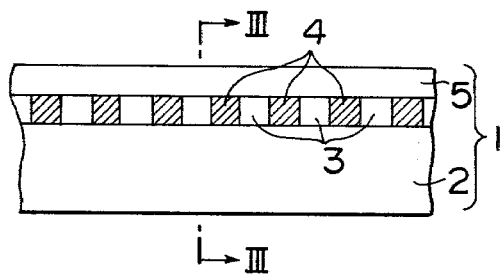
FIG. 2 is a side view of the magnetic recording medium as shown in FIG. 1.

When recording and reproducing information using the above-described magnetic medium 11, a pair of metal styluses are used in the similar manner to that described with respect to the embodiment shown in FIGS. 1 to 3. Namely, a pair of metal styluses are put into contact with the electrode 13 and one electrode block 15 to record information in the first block 14 interposed therebetween. When reproducing the recorded information, a pair of metal styluses are put into contact with the opposite exposed ends of the first block 14.

In the second embodiment, a pair of styluses may be formed into metal projections 21 provided around a metal disc 20 which is electrically connected with the electrode 13 by means of a proper electrically connecting means like a lead wire. The metal projections 21 are provided with the same pitch as the pitch of the electrode blocks 15 of the recording medium 11. The disc 20 can be rotated along the medium 11 so that the metal projections 21 may be brought into contact with the electrode blocks 15 successively.

I claim:
1. A magnetic recording means comprising a base made of a non-magnetic material, a plurality of first spaced apart blocks formed of material having a high permeability and arranged in parallel with a predetermined pitch on said base, a plurality of second blocks formed of electrically conductive material interposed between said first blocks so as to alternate therewith on said base, respective pairs of said second blocks being adapted to apply an electric field to a respective one of said first blocks, connecting means for electrically connecting adjacent ones of said second blocks, and a magnetic recording layer disposed on said first and second blocks and having a dimension less than a corresponding dimension of said first and second blocks so as to expose opposite ends of said first and second blocks to be free of said magnetic recording layer.

2. A magnetic recording means as defined in claim 1 wherein said second blocks are provided on and beneath said first blocks to vertically interpose the first blocks therebetween.

3. A method of recording information in a magnetic recording means as claimed in claim 1 comprising bringing a pair of metal styluses into contact with exposed ends of a respective pair of said second blocks, causing an electric current modulated with information to flow through said styluses to excite the first block interposed between the respective pair of second blocks, thereby magnetizing that portion of said magnetic recording layer which is adjacent the excited first block, and moving the pair of metal styluses relative to the recording means in the direction in which the first and second blocks are arranged to successively excite the first blocks by the modulated electric current.

4. A method of reproducing information recorded in a magnetic recording means as claimed in claim 1 comprising bringing a pair of metal styluses into contact with the exposed opposite ends of one of said first blocks, causing an electric current to flow through said styluses, reading out the recorded information by detecting the electrical energy across the first block, and moving the pair of metal styluses relative to the recording means in the direction in which the first and second blocks are arranged to successively read out the information for every first block.

* * * * *